United States Patent [19]

Sandrew

[11] Patent Number: 4,984,072
[45] Date of Patent: Jan. 8, 1991

[54] SYSTEM AND METHOD FOR COLOR IMAGE ENHANCEMENT

[75] Inventor: Barry B. Sandrew, Encinitas, Calif.

[73] Assignee: American Film Technologies, Inc., Wayne, Pa.

[21] Appl. No.: 222,543

[22] Filed: Jul. 25, 1988

Related U.S. Application Data

[63] Continuation-in-part of Ser. No. 81,116, Aug. 3, 1987, abandoned.

[51] Int. Cl.$^5$ ............................................... H04N 1/46
[52] U.S. Cl. ......................................... 358/81; 358/82
[58] Field of Search ......................... 358/81, 82, 75, 80

[56] References Cited

U.S. PATENT DOCUMENTS

| | | |
|---|---|---|
| 2,593,925 | 4/1952 | Sheldon .................. 358/81 |
| 2,790,844 | 4/1957 | Neugebauer ............ 358/80 |
| 2,799,722 | 7/1957 | Neugebauer ............ 358/80 |
| 2,804,500 | 8/1957 | Giacoletto .............. 358/82 |
| 2,874,212 | 2/1959 | Bechley .................. 358/82 |
| 2,883,763 | 4/1959 | Schaper .................. 358/104 |
| 2,974,190 | 3/1961 | Geiger .................... 358/22 |
| 2,982,814 | 5/1961 | Fine et al. .............. 358/82 |
| 3,005,042 | 10/1961 | Horsley .................. 358/332 |
| 3,258,528 | 6/1966 | Oppenheimer .......... 358/82 |
| 3,486,242 | 12/1969 | Aronson .................. 358/104 |
| 3,551,589 | 12/1970 | Moskovitz ............... 358/82 |
| 3,558,811 | 1/1971 | Montevecchio et al. .. 358/442 |
| 3,560,644 | 2/1971 | Petrocelli et al. ....... 358/104 |
| 3,595,987 | 7/1971 | Vlahos .................... 358/22 |
| 3,603,962 | 9/1971 | Lechner .................. 358/81 |
| 3,612,755 | 10/1971 | Tadlock .................. 358/82 |
| 3,617,626 | 11/1971 | Bluth et al. ............. 358/28 |
| 3,647,942 | 3/1972 | Siegel ..................... 358/82 |
| 3,673,317 | 6/1972 | Newell et al. ........... 358/82 |
| 3,706,841 | 12/1972 | Novak ..................... 358/82 |
| 3,710,011 | 1/1973 | Altemus et al. ......... 358/82 |
| 3,742,125 | 6/1973 | Siegel ..................... 358/81 |
| 3,761,607 | 9/1973 | Hanseman ............... 358/81 |
| 3,769,458 | 10/1973 | Driskell .................. 358/81 |
| 3,770,884 | 11/1973 | Curran et al. ........... 358/81 |
| 3,770,885 | 11/1973 | Curran et al. ........... 358/81 |
| 3,772,465 | 11/1973 | Vlahos et al. ........... 358/81 |
| 3,784,736 | 1/1974 | Novak ..................... 358/81 |
| 3,848,856 | 11/1974 | Reeber et al. ........... 358/76 |
| 3,971,068 | 7/1976 | Gerhardt et al. ........ 358/82 |
| 3,972,067 | 7/1976 | Peters ..................... 358/81 |
| 4,054,904 | 10/1977 | Saitoh et al. ............ 358/22 |
| 4,149,185 | 4/1979 | Weinger .................. 358/81 |
| 4,183,046 | 1/1980 | Dalke et al. ............. 358/81 |
| 4,258,385 | 3/1981 | Greenberg et al. ...... 358/80 |
| 4,318,121 | 2/1982 | Taite et al. .............. 358/81 |
| 4,329,710 | 5/1982 | Taylor .................... 358/81 |
| 4,334,240 | 6/1982 | Franklin ................. 358/80 |
| 4,549,172 | 10/1985 | Welk ...................... 358/81 |
| 4,590,511 | 5/1986 | Bocchi et al. ........... 358/82 |
| 4,606,625 | 8/1986 | Geshwind ............... 358/81 |
| 4,608,596 | 8/1986 | Williams et al. ........ 358/81 |
| 4,725,879 | 2/1988 | Eide et al. ............... 358/81 |

FOREIGN PATENT DOCUMENTS

933938  8/1963  United Kingdom .

OTHER PUBLICATIONS

G. R. McNeal, "Design of a Pseudocolor Generator", IEEE Eighth Annual Conference of the Engineering in Medicine and Biology Society, Nov. 1986, vol. 3 of 3, pp. 1900–1905.

E. J. Farrell, "Color Display and Interactive Interpretation of Three-Dimensional Data", IBM J. Res. Develop. vol. 27, No. 4, Jul. 1984, pp. 356–366.

Primary Examiner—James J. Groody
Assistant Examiner—Mark R. Powell
Attorney, Agent, or Firm—Ratner & Prestia

[57] ABSTRACT

A system and method for color enhancing an image or a series of images such as a motion picture by digitally capturing the images, interactively defining masks corresponding to objects in the images having similar hues, creating regions from these masks, and for each region, defining a color transfer function for converting image gray-scale information to unique values of Hue, Luminance, and Saturation. The gray-scale values within each region are then processed through that region's color transfer function, and the resulting colors applied to the image and stored for later retrieval and display.

37 Claims, 9 Drawing Sheets

SYSTEM AND METHOD FOR COLOR IMAGE ENHANCEMENT

This application is a continuation-in-part of U.S. patent application Ser. No. 081,116 filed Aug. 3, 1987, now abandoned.

FIELD OF THE INVENTION

The present invention pertains to a system and method for the color enhancement of monochrome or multi-color images by relation of digitized gray-scale information from the original image to unique values (triplets) of hue, luminance, and saturation derived from a color transfer function applied to the achromatic gray-scale information.

BACKGROUND OF THE INVENTION

In strictly mathematical terms, the image produced or black and white film is one dimensional (brightness), while an original scene can be viewed as three dimensional (using the HLS model of color, where hue, luminance, and saturation are the dimensions). The chemical reaction of the film emulsion, and the camera mechanisms and filters, essentially reduce the three dimensional information to one dimension by complex mapping, and forever obliterate the original hue, luminance, and saturation information.

Note: It should be pointed out that luminance and brightness are not the same. Since brightness of the black and white image results from the complex interactions of the three elements of the HLS system, there is only a statistical correlation between brightness and luminance, but they are not identical.

COLOR REPRESENTATION SYSTEMS

Color is both an absolute quality of light (its wavelength or frequency) and a relative quality which depends on the human perceiver. For this reason, various color "gamuts" have been proposed which allow perceived colors to be quantified. Among these models is the CIE chromaticity scale, which permits quantification of color by combinations of so-called primaries (which are, by themselves, not visible to human observers). (See Foley & VanDam, *Fundamentals of Interactive Computer Graphics*, Addison WEsley, Reading, Mass. 1984 pp. 606–608.) In addition to theoretical models of color (CIE Chromaticity, Hue-Luminance-Saturation, and Red-Green-Blue), there are many representational systems for color reproduction in various media such as the RGB system for cathode ray tubes, the process color system for printing, and the NTSC, PAL, and SECAM systems for broadcast video. Each of these models is, in fact, a relatively small subset of both the theoretical absolute range of colors and of the actual range of humanly perceivable colors.

One of the theoretical models (Ostwald, W.,*Colour Science*, Winsor & Winson, London, 1931) which is especially useful for analysis of color is the HLS model of hue, luminance, and saturation. This model uses a three dimensional cylindrical universe (the absolute theoretical color space), inside of which is a space bounded by a pair of cones having a common base (the perception space). The cylinder's axis (from apex to apex of the cones) is the luminance axis, with the lower apex having a luminance of zero (all black) and the apex of the upper cone having a luminance of 1 (all . white). Distance from the luminance axis (normal to the axis) determines saturation (proportion of a color which is made up of its complementary color), with the axis representing zero saturation (equal amounts of the primary color and its complement and therefore no color) and the surface of the cone representing maximum perceived saturation for a given luminance. Finally, angular displacement around the luminance axis represents hue, as with a conventional color wheel, with complements separated by 180 degrees.

The solid space defined by the HLS conic model is pointed at its top and bottom to represent the fact that as colors become whiter or blacker, they are perceived to lose hue. Saturation is a characteristic which depends chiefly on the narrowness or purity of the band of wavelengths comprising a color. At the exact center of the space is a medium gray which exhibits a moderate emittance or reflectance for all wavelengths of light.

The RGB system, is used, for example, in CRT displays, where each of the three electron guns (red, green, and blue) is controlled directly by a signal indicating its respective intensity. HLS color may be converted to the RGB representation (see Foley & VanDam, pp. 648-9.), however there are many HLS combinations which must be "clipped" to be represented in RGB. The same is true of NTSC video (also known as YIQ), which has an even more restricted range than RGB. Thus, not every "real world" color can be reproduced by video systems using either RGB or NTSC standards. According to Foley and VanDam, "neither the V in HSV [Hue, Saturation, Value] nor the L in HLS correspond to luminance in the YIQ model, so two different colors defined in either space can easily have the same luminance, and be indistinguishable on black and white TV or videotape." (Foley and VanDam p. 618)

Since approximately 1970, several techniques have been developed for the addition of color to monochrome images. Often, these techniques rely on video technology to augment the video signal in a defined manner, typically by adding a chrominance component signal to the pre-existing luminance signal. This technique results in an appearance not unlike that achieved by Thomas Edison in his early efforts to add tint to black and white film by painting the frames: a colored area over a black and white picture. Because of their reliance on video technology, all of these sytems suffer from lack of vividness of colors, and from an inability to accurately reproduce colors.

BRIEF DESCRIPTION OF THE INVENTION

The present invention comprises a system and method for color enhancing an image or a series of images such as a motion picture by digitally capturing the images, interactively defining areas or regions corresponding to objects or regions in the images having similar hues, and for each region, defining a color transfer function for converting image gray-scale information for each picture element to unique values of Hue, Luminance, and Saturation. The gray-scale values within each region are then processed through that region's color transfer function, and the resulting colors created in an image memory and stored for later retrieval and display.

DETAILED DESCRIPTION OF THE INVENTION

GENERAL PROCESS OVERVIEW

Figure 1:
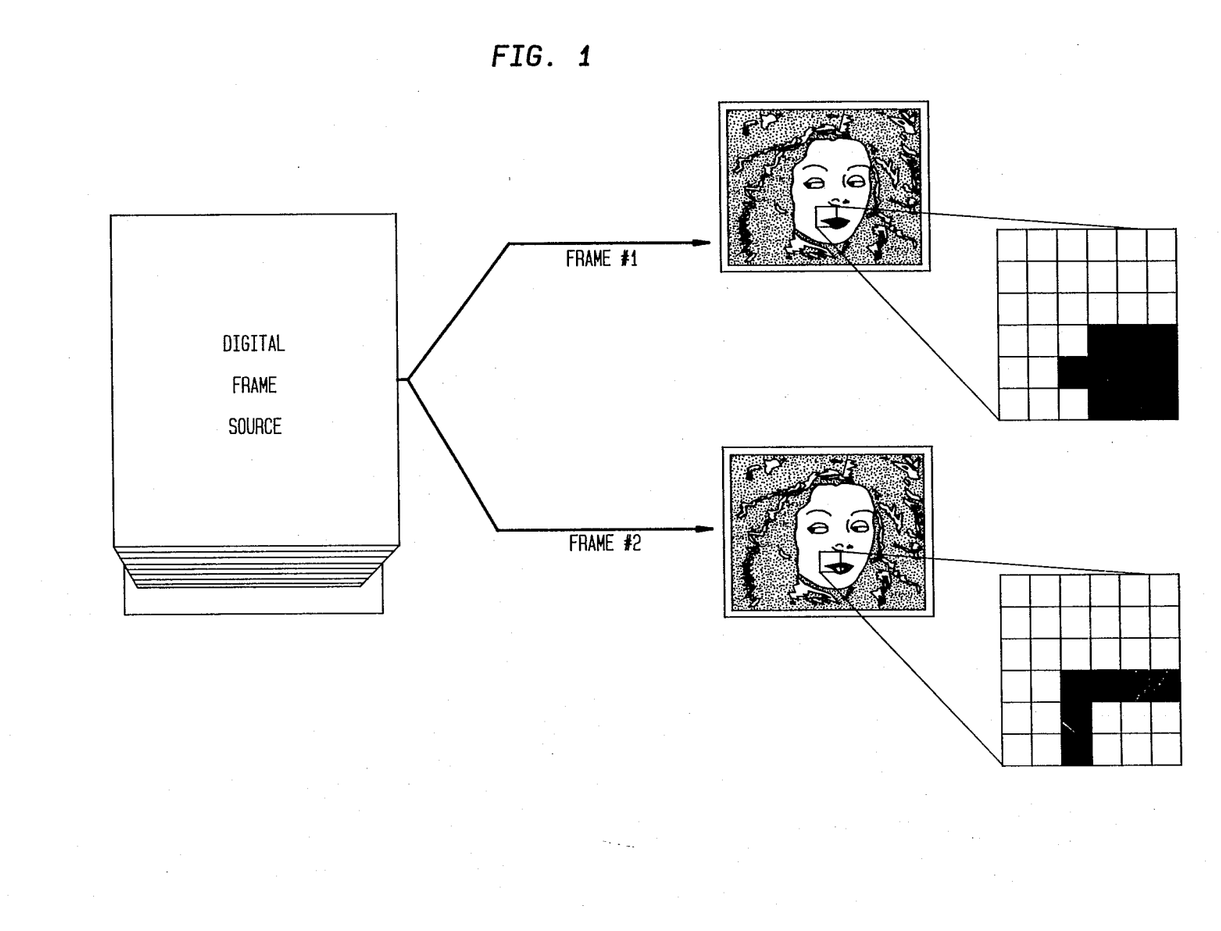
FIG. 1 depicts in schematic form the creation of two adjacent frames of graphic information according to the method of the present invention.
Figure 2:
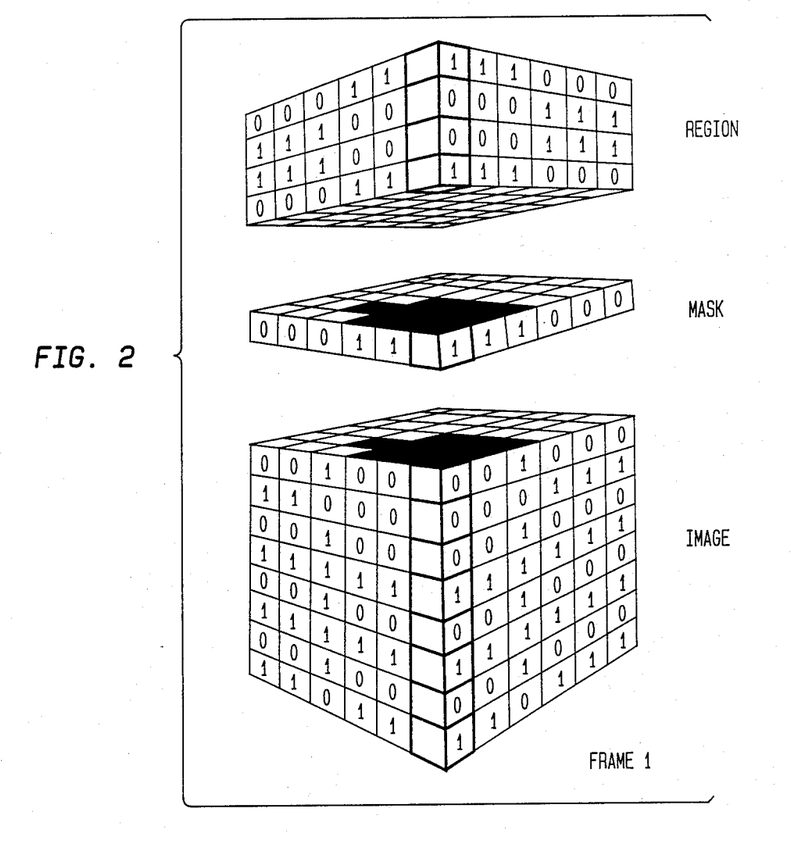
FIG. 2 is a schematic representation of a portion of the image memory structure according to one embodiment of the method of the present invention.

The film to be colored or color enhanced is first digitally recorded at a preselected resolution. In instances where the final product will be placed on conventional video tape, appropriate resolutions are employed. (E.g. NTSC=525 lines, PAL=640, HDTV=11251500) Where the final product will be used for theatrical presentation, resolutions of 1024 lines or more may be employed. The digitization process (depicted in FIG. 1) comprises projecting each frame of the original (typically black and white) film through a liquid gate device which masks scratches and other imperfections. The projected frame is captured using a video camera such as a saticon tube and the video signal is digitized and stored in a random access memory frame buffer. The digitization process allows adjustment of the intensity of light falling on the film in order to achieve the best contrast for the particular frame being digitized (gamma correction). After acquisition of a frame, the digital representation of the frame is stored in non- volatile storage for further processing. The digitization process is repeated on a frame-by-frame basis, marking each frame with a time and sequence indication (SMPTE time code).

For each scene (sequence of frames), a frame is selected as being representative of the majority of the elements present in the sequence. This "key frame" is used as a template for the enhancement of other frames within the scene sequence For this reason, the greatest care is applied to the processing of key frames.

After key frames are color-enhanced and defined, they are passed with the rest of the frames comprising a scene to a work station where the regions defining the application of color are tracked from frame to frame. After each frame has been enhanced, it is re-stored in non-volatile storage and sent to a central storage were all enhanced scenes are eventually reassembled according to their original sequence as a final product motion picture.

KEY FRAME COLORING

The first task of the key frame colorist is to identify areas of the image which comprise objects which will be designated to be of similar hue. Several software tools are available to the colorist to aid in this computer-interactive definition process.

A "free hand" mode allows drawing and erasing as well as control over a variably-sized cursor. A pointing device controls an interactive cursor displayed on a screen overlaying the key frame to be processed. Movement of the pointing device effects an analogous movement of the cursor and the picture elements selected by this movement (which are displayed on a graphics plane known as the "mask plane") are used to define the edge of an area. Because the cursor size may be reduced to only one pixel, the smallest region which may be produced is also one pixel.

A second drawing tool available to the colorist is one which defines polygons, rather than completely free-hand shapes. Using the pointing device, the colorist may indicate the precise placement of vertices which are intended to define the perimeter of a polygonal area. Each vertex may be assigned or removed and, when complete, the vertices may be completed to define a closed path.

After definition of a closed perimeter by free-hand or polygon methods, the enclosed area may be assigned to the region (by setting the bits in the mask plane) by using one of two filling algorithms. An "area fill" assigns all picture elements within the closed shape and up to the defined edge to the area. A "cartoon fill" combines the defined edges with edge recognition algorithms in order to fill an area which is bounded by a border line such as the black pen lines which are typical of cartoons. Cartoon fill mode fills up to, or slightly over such heavy border lines.

After areas have been defined for all objects having a common hue, the final step is the selection and application of a given hue to that area. Colors may be selected by interactively pointing to a color wheel displayed on a video screen, and then by manipulating control indicators on the video screen which allow refinement of the gray-scale information for the area as described below. After selection, the color may be displayed by its application to the areas (which are collectively known as a color mask.) After a color mask has been defined, its associated picture elements are identified as a "region", the mask plane is cleared, and additional masks are defined in a similar manner, one for each hue which will be displayed in the frame.

Once all regions are defined, the regions, the underlying frame, and the colors assigned to each region are stored for later retrieval by colorists who will reiterate the process using the subsequent frames of each scene and the key frame which has been defined.

The process of extrapolating color enhancement from key frames to entire scenes is performed by identifing and tracking motion as well as appearances and disappearances of objects. Generally fewer than 5% of the picture elements in a frame of a scene change in the succeeding frame. Because motion pictures are filmed at 24 frames per second, increments of motion on all but the most rapidly moving objects are extremely small and easily followed. Once motion has been identified, adjustment of the regions and application of the key frames' predefined colors to those regions is all that is required.

Implicit in all frame-to-frame tracking is the ability to copy predefined parts of the preceding or key frame's region memory contents and to use those parts in subsequent frame processing. After copying, small adjustments may be made to the new region memory contents and they may be saved with the new frame. Importantly, because the digitization process assures consistency of brightness and gray scale, and because colors are predefined by an art director working with key frames, overall consistency from frame-to-frame, and scene-to-scene is also assured.

The simplest form of tracking from frame to frame is where motion in the frame is apparent only as a result of a camera pan. In such instances, the entire region memory may be copied from that of the preceding frame and "shifted" in the direction of the pan. Such a shift will create an undefined area at the end opposite the motion. This area must then be added to the existing regions in order to completely apply color.

When only some of the objects of a frame move, a corresponding portion of the region memory may be translated as well. In this operation, that portion of the region memory which is to be moved is designated by the operator and is moved manually to its new location, thus overwriting the former contents of the region memory at the new location. The old location must then be re-defined and/or added to one or more pre-existing regions in order to apply color.

In highly complex scenes, where several types of motion are present, (especially compound motion of subject and camera) a "differencing" procedure is employed. A frame for which areas have been defined and to which color has been applied is subtracted from a next subsequent frame in order to reveal those picture elements which have changed (in gray-scale value). These areas of difference are then displayed as a contrasting overlay on the subsequent frame to be processed. Alternatively, an algorithm for edge detection in gray-scale images may be used and may be correlated to the previous frame's region memory. Detected differences may then cause the subsequent frame's regions to be adjusted or deleted, as required. By examining the coincidence of this overlay and the region structure which has been duplicated from the preceding frame, the production colorist is able to quickly designate areas which should be added to the region structure, and those which must be removed from a given region and reassigned.

The final operation is to assure that no objects have either completely appeared or disappeared from the frame. If an object disappears, its region must be removed. Similarly, newly appearing objects must have a region defined for them "on the fly" and a color assigned as well. After adjusting the region for the next subsequent image, the colorist again stores that image together with its region memory and repeats the process for each subsequent frame.

To permit quality control and review of a sequence of color-enhanced frames, two modes of viewing are used: Cine mode and Cycle mode. In cine mode, a series of frames is sequentially displayed, shuttling first in a forward direction, and then immediately in reverse. The speed may be controlled by the operator In cycle mode, display direction and speed are directly tied to the pointing device to allow fine control over viewing frame-to-frame transitions.

HARDWARE OVERVIEW

The method of the present invention is implemented on a special purpose version of an RTI-Station image processing system interfaced to a personal computer such as the IBM/personal computer AT). The RTI image processing subsystem (available from Recognition Technology, Inc. of Holliston, MA) comprises a video digitizer, a pipeline architecture pixel processor, and image memory which is all interconnected both by a host computer bus and by a sychronous video bus. The video digitizer takes its input from a video camera such as that described above for digitizing film frames, and outputs its information to a high definition color CRT (though not necessarily one interfaced by conventional NTSC video circuitry). The host computer bus permits the image processing subsystem to communicate with the user through the host CPU, its memory, associated mass storage devices, and devices including pointing devices and keyboards.

The image processing subsystem of the preferred embodiment of the present invention comprises an image memory having $512 \times 512$ spatial resolution, 8 bits of brightness resolution, and 4 bits for region identification. Alternatively, the same system may be configured for 6 bits of brightness resolution and 6 bits of region identification or for 7 bits of brightness resolution and 5 bits of region identification. (one additional bit is reserved for use by the system in construction of the mask bit plane.) General information regarding the structure and operation of the RTI Station and its associated software library (RTILIB) may be found in the RTILIB/500 Tutorial Revision 1.00 and the RTI-LIB/500 User Manual Revision A, which are published by Recognition Technology, Inc.

Although the currently used implementation employs a 512 line spatial resolution, it will be recognized by those skilled in the art that increases to and above 2000 line spatial resolution are within the scope of the present invention. Additionally, the image memory may be a part of a larger frame store memory which may be, for instance, $4096 \times 4096 \times 16$ bits. The display of frames may then be controlled by a memory pointer into this frame store.

For the purpose of color selection, the host CPU is provided with a 24 bit RGB video board (such as the Targa 24, a product of AT&T Information Systems, Inc.) A color wheel which corresponds to the common base of the HLS cone is displayed on a video screen. Using a pointing device, the colorist selects a particular color on the wheel, thus defining both hue (angular position on the color wheel) and saturation (distance from the center). As described more fully below, this unique 24 bit RGB value is translated immediately into the HLS coordinate space, correlated to the modified image gray-scale, and retranslated for output on an RGB monitor.

SOFTWARE OVERVIEW

Figure 3:
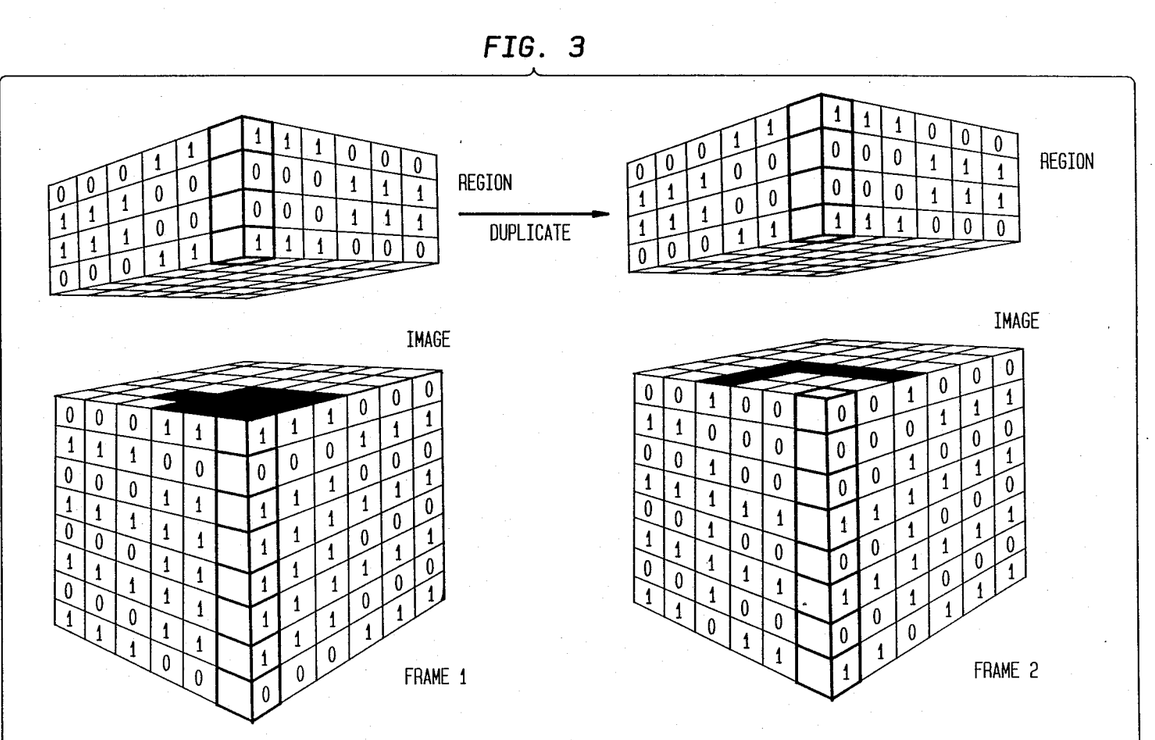
FIG. 3 depicts the replication of a the region memory portion of the image memory structure of the present invention.
Figure 4:
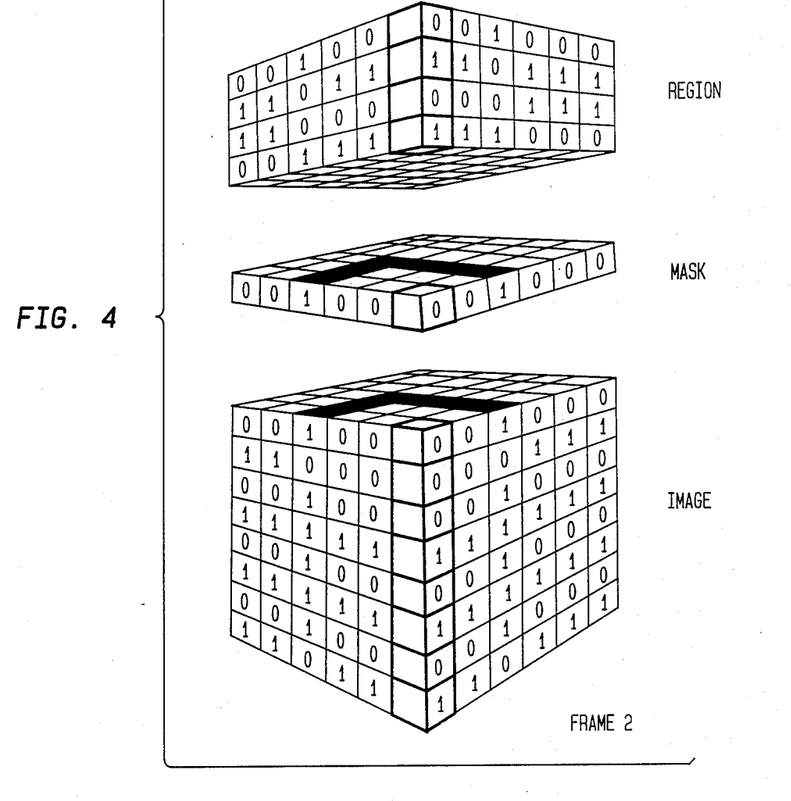
FIG. 4 depicts the correction of a value stored in the replicated region memory portion of FIG. 3.
Figure 5:
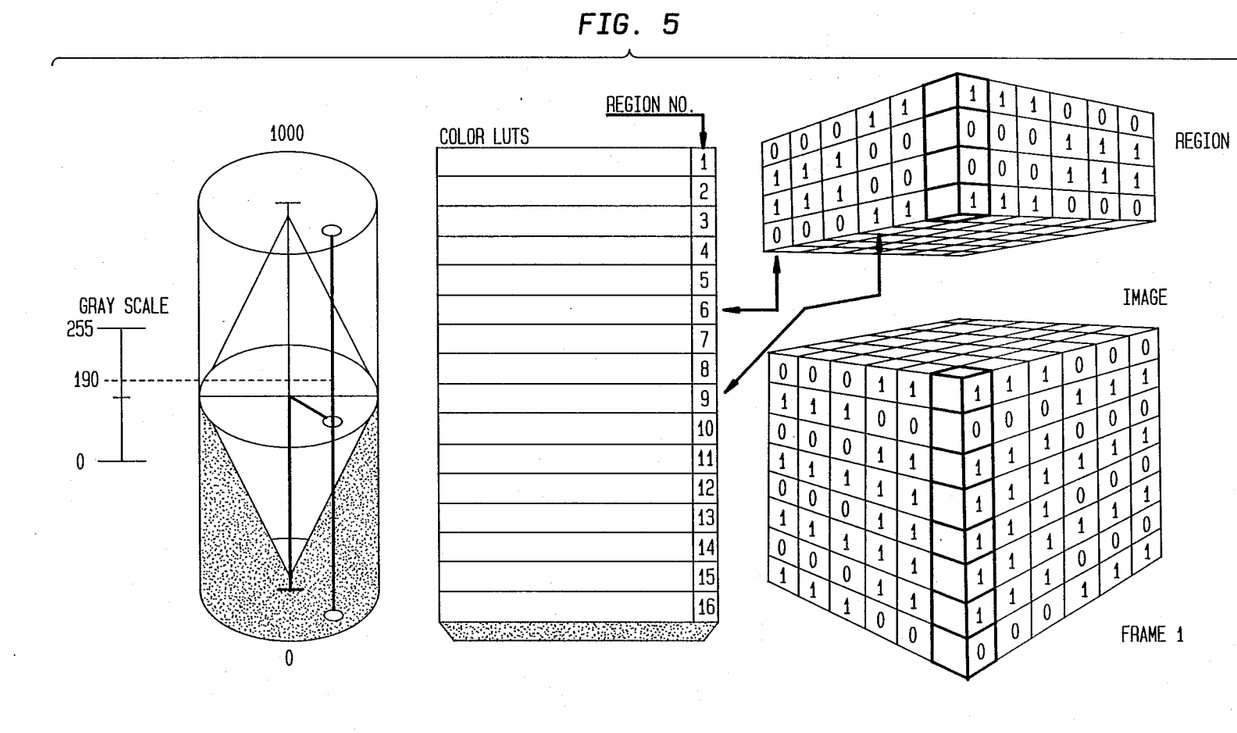
FIG. 5 depicts the application of the HLS color model to the coloring of an array of picture elements stored in the image memory structure of FIGS. 2-4.

Referring now to FIGS. 1-4, according to the method of the present invention, a series of digitized monochrome images may be stored in a random access memory of a computer as an array of gray-scale values. For example, 8 bits of information may be used to represent each picture element, thus permitting a total of 256 unique gray-scale values to be represented. (Of course, more bits may be used to achieve better resolution and dynamic range for the gray-scale information.) The digitization step may optionally include the use of lookup tables in order to enhance contrast, adjust gamma, enhance edge definition or "stretch" the gray-scale of a faded image. Associated with the memory used to store the gray-scale values is a region memory used to uniquely identify each picture element with one of a number of regions (depicted as a four bit memory structure in FIGS. 2-5). In addition to the image memory and region memory structures, a mask plane memory is also associated with the image for use in identifying picture elements. Through conventional techniques, the contents or parts of the contents of these memory structures may be copied from one structure to another (for example, from the region memory to the mask plane memory) or from one frame's memory to another (as depicted in FIG. 3 for the transfer of frame 1 region memory to frame 2 region memory.) The copied contents may, of course, be altered by the operator to conform to the underlying frame contents as depicted in FIG. 4.

As depicted in FIGS. 5-9, the colorist has at his or her disposal a number of software-implemented tools which control the construction of the color transfer function. For computational efficiency, the luminance axis of HLS cylindrical space is represented as an integer range of [0..1000] (as opposed to the conventional representation as a real number in the range [0..1.0]). The gray-scale of a frame is linearly related to the integer range by defaulting a gray-scale value of 128 to a luminance value of 500, and corresponding each discrete gray-scale unit to each integer of luminance. (Thus, 255 gray-scale corresponds by default to a luminance of 627.)

In order to affect the color transfer function constructed by the system, the colorist actually manipulates the frame gray-scale information by applying histogramming techniques such as translation, compression, and stretching.

Figure 6A:
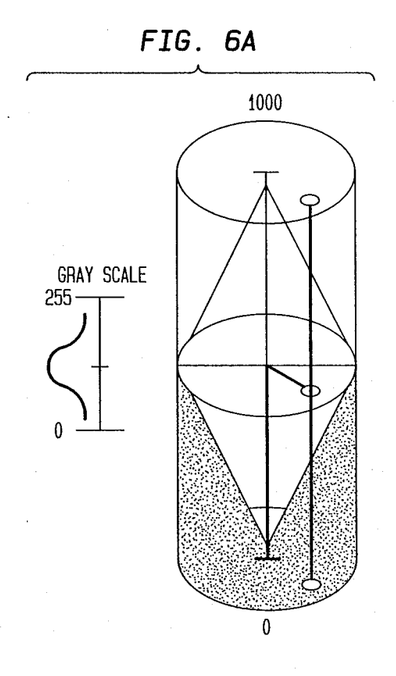
FIG. 6 depicts a schematic representation of the "histogram slide" operation according to the method of the present invention.
Figure 6B:
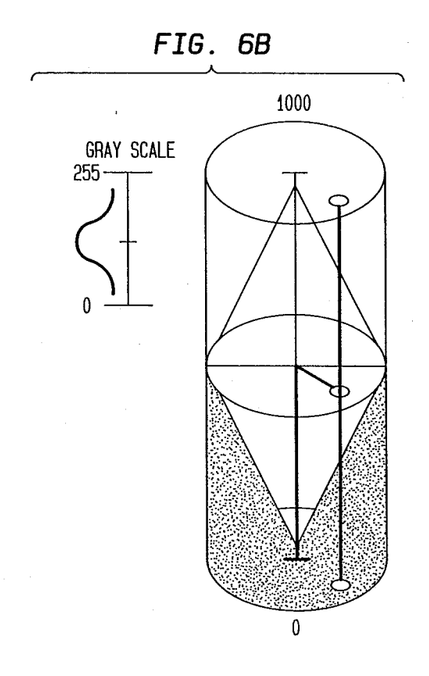
Figure 6C:
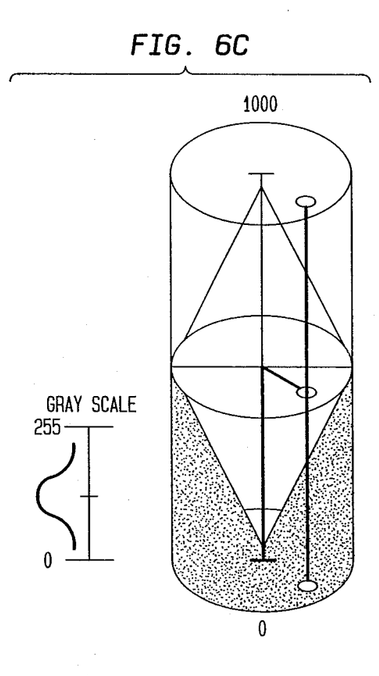

Specifically, the entire gray-scale may be made to appear either more or less luminous by a simple "slide" of the gray-scale (GS) with respect to the luminance scale (FIG. 6). Instead of corresponding GS = 128 to L = 500, the operator may instead choose to brighten the frame by choosing L = 750. Similarly, the frame may be darkened by choosing L = 350. As depicted in FIG. 6, the portion of the color transfer function falling within the HLS conic space which corresponds to the gray-scale is controlled by this slide operation. At its extremes, the operation creates a threshhold in the transfer function beyond which all gray-scale values are displayed as either white (above the upper threshhold), or as black (below the lower one).

LISTING 1

```
Listing 1
void slide_map( );               /*slide brightness mapping */
void stretch_map( );             /*stretch or compress brightness mapping */
void bend_on( );                 /*enable color bending */
void bend_off( );                /*disable color bending */
void slide_bend( );              /*slide region of color bending */
void stretch_bend( );            /*stretch region of color bending */
/*LOCAL CONSTANTS—            */
#define TRUE 1
#define FALSE 0
/*Local Static Data—           */
static int brt_l = 0;            /*brightness value for start of ramp */
static int brt_u = 1000;         /*brightness value for end of ramp */
static int bend = FALSE;         /*logical - TRUE if color bend enabled */
static int mark1;                /*lower color bending overlap marker */
static int mark2;                /*upper color bending overlap marker */
/*Global Data (and externals)— */
extern int hue_1;                /*primary hue value - [0..360] */
extern int sat_1;                /*primary saturation value - [0..1000] */
extern int hue_2;                /*secondary hue value - [0..360] */
extern int sat_2;                /*secondary saturation value - [0..1000] */
                                 /*secondaries valid for bend = TRUE only */
void slide_map (dbrt)
int dbrt;                        /*change in brightness - [-999..999] */
{
    /*make sure that the requested change is in range */
    dbrt = max ( dbrt, -999);
    dbrt = min ( dbrt, 999);
    /*check for limiting case */
    if ( ( dbrt < 0) && (brt_l < -dbrt) ) {
        stretch_map ( -brt_l, 1000-brt_u);
        return;
    /*Simple case: apply the change */
    brt_l += dbrt;
    brt_u += dbrt;
    if ( bend) {
        mark1 += dbrt;
        mark2 += dbrt;
        }
    }
/* End Slide map */
```

Figure 7A:
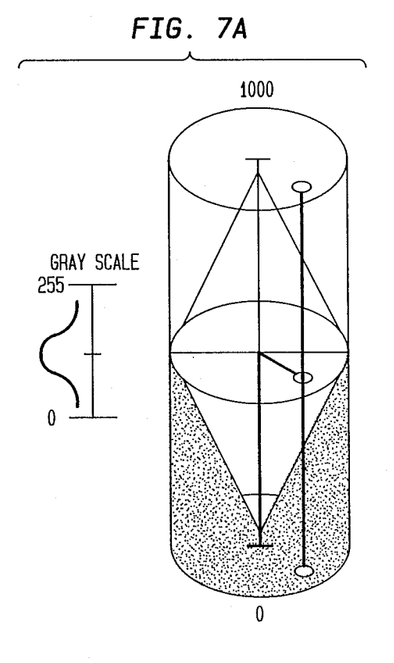
FIG. 7 depicts a schematic representation of the "histogram multiplication down" operation according to the method of the present invention.
Figure 7B:
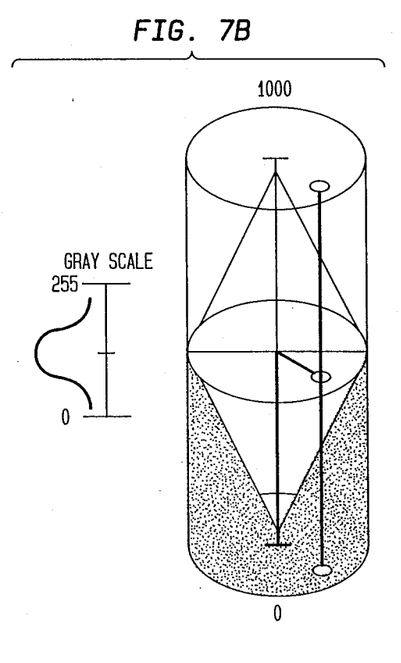
Figure 7C:
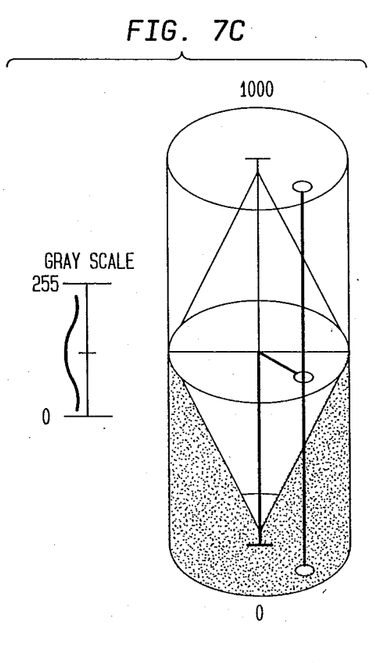
Figure 8A:
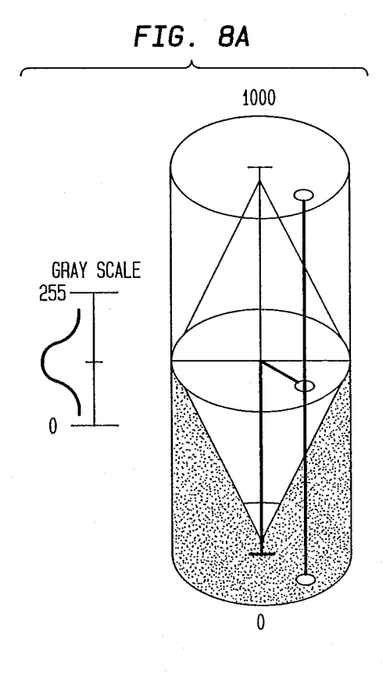
FIG. 8 depicts a schematic representation of the "histogram multiplication up" operation according to the method of the present invention.
Figure 8B:
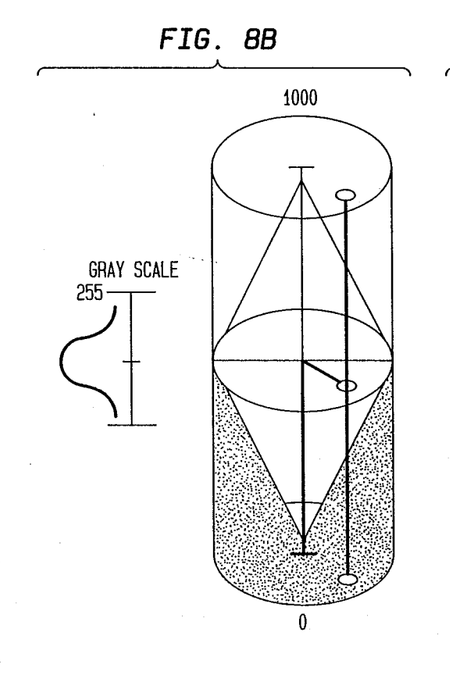
Figure 8C:
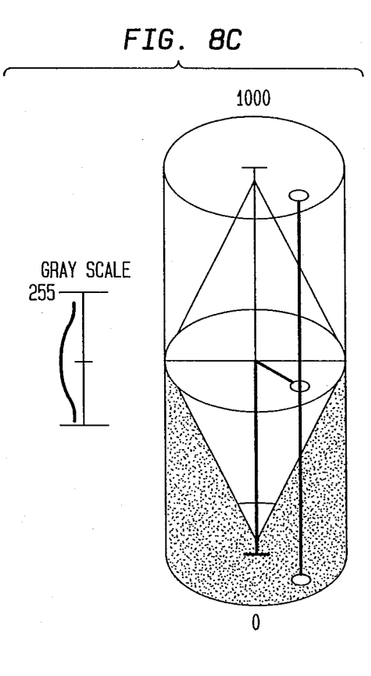

Another operation available to the colorist is a ratiometric multiplication of the gray-scale by a value (depicted in FIGS. 7-8). When the multiplier value is a fraction less than one, a ratiometric compression of the gray-scale occurs which relates the 256 discrete gray-scale values to fewer than 256 integer luminance values. When the multiplier value is greater than unity, a "stretch" of the gray-scale occurs which results in a correspondence of the 256 gray-scale values to a range of luminance greater than 256. These multiplications may also occur using either end of the gray-scale as a fixed point, yielding 4 variations as depicted in FIGS. 7-8.

LISTING 2

```
Listing 2 void strech_map( db_low, db_up)
int db_low;    /* change in lower ramp point */
int db_up;     /* change in upper ramp point */
{
int newbrt_l, newbrt_u, newmark_l, newmark_u;
double fmark1, fmark2, rlen, newrlen;
      /* Check that change parameters are within range */
         db_low = min( db_low, 999);
         db_low = max( db_low −999);
         db_up = min( db_up, 999);
         db_up = max( db_up, −999);
      /* Apply change to lower ramp point*/
         newbrt_l = brt_l + db_low;
         newbrt_l = max( newbrt_l, 0);
         newbrt_l = min( newbrt_l, 999);
      /* Apply change to upper ramp point */
         newbrt_u = brt_u + db_up;
         newbrt_u = max( newbrt_u, 1);
         newbrt_u = min( newbrt_u, 1000);
      /* Make sure that the new combination is valid */
         if( (db_up == 0) && (newbrt >= newbrt_u) )
              newbrt_newbrt_u − 1;
         else if( newbrt_u <= newbrt_l)
              newbrt_u = newbrt_l + 1;
      /* Reset color-bend markers for new ramp */
         if( bend){
              rlen = (double)( brt_u − brt_l);   /* current
```

```
-continued
Listing 2
              ramplen */
              newrlen = (double)( newbrt_u − newbrt_l);
                 /*new ramplen */
              fmark1 = (double)( mark1 − brt_l) / rlen;
              fmark2 = (double)( mark2 − brt_l) / rlen;
              mark1 = (int)( fmark1 * newrlen) + newbrt_l;
              mark2 = (int)( fmark2 * newrlen) + newbrt_l;
         }
      /* Move new ramp points into official ramp points */
         brt_l = newbrt_l;
         brt_u = newbrt_u;
}                                /*End of stretch-map */
```

Figure 9:
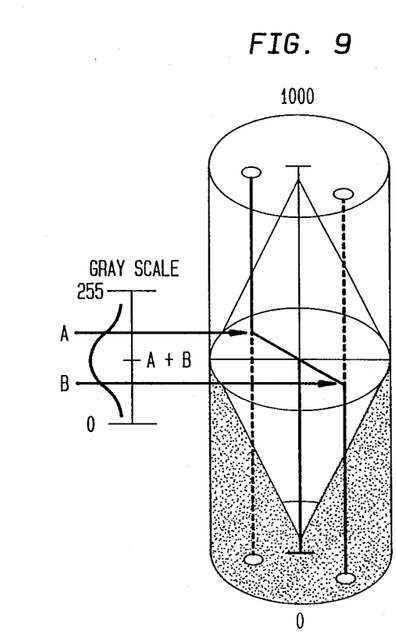
FIG. 9 depicts a schematic represention of the "color bending" operation according to the method of the present invention.

In depicting reflected light (either originating from a colored source, reflecting from a colored surface, or both), it is necessary to "bend" the color transfer function. As shown in FIG. 9, the colorist has available the option of setting a pair of "bending points" for the function which determine the nature and extent of the bending. These points, depicted in FIG. 9, (as points A and B) define the endpoints of three line segments (OB, BA, and A1). Of these segments, the first and last each have associated with them unique, operator-selected values of hue, while the AB segment represents a mixture of hues and saturations. The locations of points A and B are defaulted to 25% and 75% of the current gray-scale range, thus providing color mixing over one-half of the gray-scale. These locations, however, may be changed by the operator to change the "rate" of color bending.

LISTING 3

```
Listing 3 void bend_on( )
{
    int midpoint, ramplen;
         if( bend) return;                        /* already done, do nothing */
         ramplen = (brt_u − brt_l + 1);           /* length of current ramp */
         midpoint = brt_l + ramplen /2;           /* midpoint of current ramp */
         mark1 = midpoint − ramplen/4;            /* bottom of color overlap */
         mark2 = midpoint + ramplen/4;            /* top of color overlap */
}   /* End of bend_on */
void bend_off( )
{
         bend = FALSE;
}   /*End of bend-off */
void slide_bend( dbend)
int dbend:       /* change in region of bend -   −999 to 999*/
{
    int ovlplen;
    /* If bend not enabled, do nothing */
         if( lbend) return;
    /* Make sure that there is room to go in the requested direction */
         if( ( dbend < 0) && (mark1 == brt_l) ) return;
         if( (dbend > 0) && (mark2 == brt_u) ) return;
    /* Make sure that the requested change is within range */
         dbend = (dbend < 0) ?   max ( dbend, brt_l − mark1):
                                 min( dbend, brt_u − mark2);
    /* Apply the change */
         mark1 += dbend;              /* new mark1 position */
         mark2 += dbend;              /* new mark2 position */
}   /* End of slide_bend */
void stretch_bend( sfact)
int sfact;       /* stretch factor (−100 to 100)*/
{
    double fact, hmarklen, markfact, marklen, midpoint, ramplen;
    /* Compute a floating point stretch factor */
         fact = (sfact >= 0) ?   1.0 + (double)sfact / 100.0;
                                 1.0 − (double) (-sfact)/100.0;
    /* Get floating point ramp, overlap length and midpoint of bend */
         ramplen = (double) ( brt_u − brt_l + 1);
         marklen = (double) ( mark2 − mark1 + 1);
         midpoint = (double)mark1 + marklen/2.0;
    /* Compute and adjust the percentage overlap */
```

-continued

Listing 3

```
        markfact = marklen / ramplen;
        markfact *= fact:                          /* apply change */
        hmarklen = (ramplen * markfact) / 2.0;     /* half new mark length */
/* Compute new mark points */
        mark1 = max( (int)( midpoint - hmarklen), brt__l);
        mark2 = min( (int)( midpoint + hmarklen), brt__u);
} /* End of stretch__bend */
```

As an example of bending, consider the selection of a OB hue as flesh tone, and the A1 hue as orange (as would be the case if a face were viewed by reflected fire light). The BA segment would contain hues which are flesh tones in the less bright areas, but for brighter ones, take on more and more orange appearance. Of course, it will be appreciated that the selection of the locations of points A and B or the inclusion of additional bending points are fully within the spirit of the technique.

Because regions are defined so as to include all objects of a similar hue, regions contain a wide range of picture element gray-scale values. In order to accurately represent the gray-scale values in the final colored image, a color transfer function must be defined for converting the one-dimensional gray-scale to a set of three dimensional HLS values. From the point on the displayed color wheel chosen by a key frame colorist, a line segment is extended vertically parallel to the axis of the cylindrical HLS universe. This line segment passes through the points in the HLS cones which represent the colors to be applied within the region, and comprises the color transfer function. For example, an 8 bit picture element having a gray-scale value of 190 is represented on the gray-scale of FIG. 5. The corresponding point on the upper segment of the color transfer function defines a unique HLS value which will be applied to those picture elements within the region having the 190 gray-scale value. Where the line segment does not fall within the HLS conic space, the representation is either pure white (in the region above L=0.5) or pure black (in the region below L=0.5). It will be recognized that because the color transfer function traverses a portion of the altitude of HLS coordinate space, points which fall at either extreme of the gray-scale are correspondingly less saturated when displayed in color. This renders the displayed colors much more realistic than systems using constant saturations.

Specular highlights are those areas of particularly bright reflection due to angle of incidence effects. The production of colorless specular highlights can be produced by applying the histogram stretch technique described above to "pull" brighter gray-scale values outside of the HLS cone, thus making them appear white. The extent of this stretch controls the appearance of the specular highlight.

Referring again to FIG. 9, there is depicted a schematic representation of the method by which both specular highlights and reflection of colored light sources may be achieved. Although human perception is, in fact, best represented by the HLS double cone, the actual physics of color and light are best represented by an HLS cylinder which has luminance as its axis, and saturation as its radius. Within this cylinder is inscribed the conic perceptual space. This conic space defines the limits of human perception, and the precise shape and size of the cones varies from person to person. (A color-blind person, for example, has a cone with a "flattened" side, while one with night-blindness has an extremely truncated lower cone.) By manipulating gray-scale information representing an image, the color transfer function by which gray-scale is transformed into hue, luminance, and saturation is affected, and a variety of effects are produced

GLOSSARY OF TERMS

Image—monochrome or color analog picture

Picture Elements—discrete locations in an image

Brightness—the absolute amount of light transmitted through a monochrome image (dependent on incident light intensity)

Capturing an Image Digitally—recording digital data representative of an image and from which an image can be re-created.

Gray-Scale Value—relative amount of light transmitted through a point on a monochrome image (dependent on incident light intensity)

Luminance—the absolute amount of light emitted by, or transmitted through a point on a color image Hue—the peak or primary wavelength emitted by or transmitted through a point on a color image Saturation—the relative number of primary to complementary points in a given area of a color image (more primary = higher saturation)

Region—a data structure in memory used to identify a group of picture elements to which a defined color transfer function is to be applied.

Mask—a data structure (commonly a graphics plane) in memory used to identify a group of picture elements to be acted upon, such as by their inclusion within a region.

Map—a data structure (commonly a multi-bit graphics plane) for identifying one or more regions of an image, each such region comprising picture elements representative of one or more objects or image areas having the common property.

Specular Highlight—region of high brightness (monochrome) or high luminance (color) brought about by direct (angle of incidence) reflection of a light source.

STATEMENT OF INDUSTRIAL UTILITY

The method and apparatus of the present invention is useful in the color enhancement of achromatic images such as still photographs, motion pictures, video taped images, telemetry data, and the like.

I claim:

1. A method of color enhancing an image comprising the steps of:
   a. capturing the image digitally, as a series of picture elements, each having a gray-scale value representative of its brightness;
   b. defining on or more masks, each comprising one or more closed regions of picture elements representative of one or more operator-perceived objects within the image having the same operator-designated hue;

c. defining a color transfer function for each of said masks identifying each of said picture element gray-scale values within each of said masks with a unique combination of hue, luminance, and saturation values;

d. applying said color transfer function for each of said masks to said corresponding picture element gray-scale values, thereby deriving unique combinations of hue, saturation, and luminance values corresponding to each gray-scale value; and e. assigning said derived hue, saturation, and luminance values to said picture elements corresponding to each of said masks.

2. The method of claim 1 wherein said picture element gray-scale values are modified prior to step (d) by stretching the gray-scale.

3. The method of claim 1 wherein said picture element gray-scale values are modified prior to step (d) by compressing the gray-scale.

4. The method of claim 1 wherein said picture element gray-scale values are modified prior to step (d) by sliding the gray-scale.

5. The method of claim 1, step (c) further comprising the steps of:
   a. selecting an arbitrary operator-defined hue value intended for application to the picture elements corresponding to each of said masks;
   b. selecting a range of luminance values representative of the brightness of said picture elements corresponding to each of said masks;
   c. selecting a range of saturation values representative of the saturations of the picture elements corresponding to each of said masks;
   d. constructing a predetermined color transfer function relating said range of luminance values to said range of saturation values.

6. The method of claim 5 further comprising:
   for at least one operator-defined mask, for which an operator defined arbitrarily selected hue value has been designated in accordance with step (a) of claim 5,
   selecting at least one arbitrary second hue value representative of an operator-designated hue of an illumination source; and
   wherein step (d) of claim 5 further comprises constructing a predetermined hue-luminance-saturation transfer function relating said ranges of saturation and luminance values to said first and second hue values.

7. The method of claim 1, step (c) further comprising the steps of:
   a. selecting a luminance value representative of the average brightness of the picture elements corresponding to said mask;
   b. selecting a range of hue values representative of the hues of said picture elements corresponding to said mask;
   c. selecting a range of saturation values representative of the saturations corresponding to said mask;
   d. constructing a predetermined hue-saturation transfer function relating said range of hue values to said range of saturation values.

8. The method of claim 1 wherein at least one of said regions is defined by manually designating the bounds of one or more areas using a pointing device to define a mask.

9. A method of color enhancing a series of image frames comprising the steps of:
   a. capturing and storing each image frame digitally, as a series of picture elements, each having a gray-scale value representative of its brightness;
   b. designating one of said captured frames as a key frame;
   c. using said key frame, defining one or more maps, each comprising one or more closed regions of picture elements representative of one or more objects designated to have the same hue;
   d. defining for at least one of said maps a color transfer function identifying said picture element gray-scale values with unique combinations of hue, luminance, and saturation values;
   e. correlating said picture element gray-scale values to said color transfer function, thereby deriving unique hue, saturation, and luminance values corresponding to each gray-scale value, and
   f. assignign said hue, saturation, and luminance values to said picture elements comprising said map;
   g. storing said map in association with said key frame;
   h. sequentially recalling said stored image frames, and for each frame:
   i. comparing said recalled frame with the preceding frame, to determine differences in the locations of said objects;
   j. establishing a modified map by modifying a copy of each of said maps by selective deletion of picture elements which no longer define said objects, and addition of picture elements which define said objects, in accordance with said determined differences in the locations of said objects,; and
   k. storing said modified maps in association with said recalled frames.

10. A system for color enhancing an image comprising:
    a. means for capturing the image digitally, as a series of picture elements, each having a gray-scale value representative of its brightness;
    b. means for defining one or more masks, each comprising one or more closed regions of picture elements representative of one or more operator-perceived objects within the image having the same operator-designated hue;
    c. means for defining a color transfer function for each of said masks identifying said picture element gray-scale values within each of said masks with unique combinations of hue, luminance, and saturation values;
    d. means for applying said color transfer function for each of said masks to said corresponding picture element gray-scale values, thereby deriving unique combinations of hue, saturation, and luminance values corresponding to each gray-scale value; and
    e. means for assigning said derived hue, saturation, and luminance values to said picture elements corresponding to each of said masks.

11. A method of color enhancing a source image comprising the steps of:
    a. recording said source image digitally, as a first series of picture elements, each having a gray-scale value representative of its brightness;
    b. defining a first series of one or more masks within said source image, each comprising one or more closed regions of picture elements representative of one or more operator-perceived objects within the image having the same operator-designated hue;

c. defining a color transfer function for each of said masks identifying said picture element gray-scale values with unique combinations of hue, luminance, and saturation values;

d. applying said color transfer function to each of said picture element gray-scale values, thereby deriving unique combinations of hue, saturation, and luminance values corresponding to each gray-scale value; and e. assigning said derived hue, saturation, and luminance values to a second series of picture elements in a second series of masks, each such mask corresponding in shape, size and position to a mask in said first series of masks, and storing said assigned values for said picture elements of said second series of masks as a recording of an output image.

12. The method of claim 1, step (d) further comprising the steps of:

(a) determining whether said unique saturation value which corresponds to said picture element gray-scale value is beyond a maximum saturation value limit which approximates the maximum, visually perceivable saturation value for said unique luminance value which corresponds to said picture element gray-scale value; and (b) assigning said maximum saturation value as a new saturation value for said picture element if said unique saturation value is beyond the maximum saturation value for said unique luminance values which corresponds to said picture element gray-scale value.

13. The method of claim 12, wherein the new saturation value is black if said unique luminance value is less than 500 on a luminance scale ranging from 0 to 1000.

14. The method of claim 12, wherein the new saturation value is white if said unique luminance value is greater than 500 on a luminance scale ranging from 0 to 1000.

15. The method of claim 12, wherein said maximum saturation values for all unique luminance values defines a boundary for a double conic space in a hue, luminance, saturation (HLS) coordinate system.

16. The method of claim 15, wherein said double conic space is symmetrical about a central point located midway between a maximum unique luminance value and a minimum unique luminance value.

17. The method of claim 15, wherein said double conic space is asymmetrical about said central point.

18. The method of claim 17, wherein each cone in said asymmetrical double conic space has a base and an apex and the base-to-apex distance is different for each of said cones.

19. The method of claim 6 wherein said predetermined hue-luminance-saturation transfer function is adapted to cause the hue values of said operator defined mask to be displayed in brighter portions thereof as if said operator defined mask hue value was the hue value of said operator designated hue value of an illumination source.

20. A system for coloring a monochrome image having a plurality of regions comprising:

a. means for digitally storing said image as a multiplicity of pixels, each represented by a specific gray scale value;

b. means for storing a product of a separate color transfer function for each of said regions; and c. means for digitally storing, for each pixel, a region identifier by which one of said color transfer functions is associated with said pixel.

21. The system of claim 20 wherein said color transfer function is constructed of operator manipulated relationships of hue, luminance, saturation and gray-scale values.

22. The system of claim 20 wherein (a) and (c) are part of a multi-bit memory structure comprising a first memory structure and a second memory structure.

23. The system of claim 22 wherein for each pixel of said image, said first memory structure contains an 8 bit gray-scale value and said second memory structure contains a 4 bit region identifier value.

24. The system of claim 22 further comprising an additional memory structure adapted to contain pixel identification information designating which pixels are identified with a particular region.

25. The system of claim 20 wherein a. said color transfer functions are constructed of operator manipulated relationships of hue, luminance, saturation and gray-scale values;

b. (a) and (c) of claim 23, are part of a multi-bit memory structure comprising, for each pixel, a first memory structure containing an 8 bit of gray-scale value and a second memory structure containing a 4 bit region identifier value; and c. an additional one-bit memory structure adapted to contain, for each pixel, pixel identification information designating which pixels are identified with a particular region.

26. A system for coloring a monochrome image having a plurality of regions comprising:

a. means for digitally storing said image as a multiplicity of pixels, each represented by a specific gray scale value; and b. means for digitally storing, for each pixel, a region identifier by which each of said pixels is associated with one of said regions.

27. The system of claim 26 wherein a color transfer function is associated with each of said regions and is constructed of operator manipulated relationships of hue, luminance, saturation and gray-scale values.

28. The system of claim 26 wherein (a) and (b) are part of a multi-bit memory structure comprising a first memory structure and a second memory structure.

29. The system of claim 28 wherein for each pixel of said image, said first memory structure contains an 8 bit gray-scale value and said second memory structure contains a 4 bit region identifier value.

30. The system of claim 28 further comprising an additional memory structure adapted to contain pixel identification information designating which pixels are identified with a particular region.

31. The system of claim 27 wherein a. said color transfer function is constructed of operator manipulated relationships of hue, luminance, saturation and gray-scale values;

b. (a) and (b) of claim 29, are part of a multi-bit memory structure comprising, for each pixel, a first memory structure containing an 8 bit gray-scale value and a second memory structure containing a 4 bit region identifier value; and c. an additional one-bit memory structure adapted to contain, for each pixel, pixel identification information designating which pixel are identified with a particular region.

32. A system for coloring a monochrome image having a plurality of regions comprising:
   a. means for digitally storing said image as a multiplicity of pixels, each represented by a specific gray scale value; and
   b. means for digitally storing, for each pixel, a region identifier by which one of a color transfer function is associated with each of said regions.

33. The system of claim 32 wherein each of said color transfer functions is constructed of operator manipulated relationships of hue, luminance, saturation and gray-scale values.

34. The system of claim 32 wherein (a) and (b) are part of a multi-bit memory structure comprising a first memory structure and a second memory structure.

35. The system of claim 34 wherein for each pixel of said image, said first memory structure contains an 8 bit gray-scale value and said second memory structure contains a 4 bit region identifier value.

36. The system of claim 34 further comprising an additional memory structure adapted to contain pixel identification information designating which pixels are identified with a particular region.

37. The system of claim 32 wherein
   a. said color transfer functions are constructed of operator manipulated relationships of hue, luminance, saturation and gray-scale values;
   b. (a) and (b) of claim 35, are part of a multi-bit memory structure comprising, for each pixel, a first memory structure containing an 8 bit gray-scale value and a second memory structure containing a 4 bit region identifier value; and
   c. an additional one-bit memory structure adapted to contain, for each pixel, pixel identification information designating which pixels are identified with a particular region.

* * * * *